United States Patent [19]

Häfner

[11] Patent Number: 4,497,213

[45] Date of Patent: Feb. 5, 1985

[54] GYROSCOPIC FORCE MEASURING CELL

[75] Inventor: Hans W. Häfner, Aichach, Fed. Rep. of Germany

[73] Assignee: Pfister GmbH, Fed. Rep. of Germany

[21] Appl. No.: 505,469

[22] Filed: Jun. 17, 1983

[30] Foreign Application Priority Data

Jun. 23, 1982 [DE] Fed. Rep. of Germany ....... 3223403

[51] Int. Cl.$^3$ .......................... G01L 1/00; G01L 1/26
[52] U.S. Cl. .................................. 73/862.38; 177/264
[58] Field of Search ...................... 73/862.38; 177/264

[56] References Cited

U.S. PATENT DOCUMENTS 4,095,463  6/1978  Wohrl ............................. 73/862.38

FOREIGN PATENT DOCUMENTS 2058144  6/1972  Fed. Rep. of Germany ... 73/862.38
2070784  9/1981  United Kingdom .

Primary Examiner—Charles A. Ruehl

Attorney, Agent, or Firm—Hill, Van Santen, Steadman & Simpson

[57] ABSTRACT

A gyroscopic force measuring cell has a frame having a gyroscope suspended force-free therein with an inner gimbal and an outer gimbal, a force indicent at the rotational axis of the gyroscope and generating a torque producing a precessional motion about the precessional axis, the motion exhibiting a velocity which is proportional to the incident force and being a measurement thereof. The measuring cell has a linkage for force initiation from a non-co-precessing load pickup through a co-precessing transmission element disposed in a pivot bearing along the precessional axis, the pivot bearing being linked to a pivot bearing housing so as to be coaxially movable in guides relative to the precessional axis. The transmission element is a shaft seated in the pivot bearing having a substantially radial load arm and an element for force transmission connecting the load arm to the inner gimbal, the load arm, the element for force transmission, the rotational axis and the precessional axis being in substantially one plane.

10 Claims, 3 Drawing Figures

GYROSCOPIC FORCE MEASURING CELL

BACKGROUND OF THE INVENTION

The present invention relates to a gyroscopic force measuring cell having a frame with a gyroscope suspended force-free therein with an inner and outer gimbal such that a force incident at the rotational axis of the gyroscope and generating a torque produces precessional motion about the precessional axis having a velocity which is proportional to the force and which serves as a measurement thereof.

A gyroscopic force measuring cell wherein the precessional motion generated about the vertical axis of the gyroscope by a force to be measured is employed for measuring the force is described in German OS 29 19 702, for example. The force to be measured is either directly or indirectly incident at the non-co-precessing portion of a suspension of the gyroscopic force measuring cell rotatably seated about the vertical axis. In this known force measuring cell, the co-precessing portion of the suspension is hinged by means of bands to the respective inner and outer gyroscope gimbals. In one embodiment, the bands connected to the inner gyroscope gimbal intersect the bands connected to the outer gimbal.

This conventional arrangement is unstable and is susceptible to relatively rapid deterioration of the overall measuring system, thus leading to measuring errors due to the influence of external forces, particularly cross forces. This conventional device is moreover sensitive to incident loads which are not precisely coaxial relative to the precessional axis. The unequal elongation of the bands due to temperature effects causes migration of the rotational axis of the rotatable bearing out of alignment with the precessional axis, thus resulting in asymmetrical loads and consequently also leading to measurement errors. Additionally, an inclination of the gyroscope rotational axis causes the same disadvantageous consequences, even if such inclination is very small.

SUMMARY OF THE INVENTION

It is an object of the present invention to provide a gyroscopic force measuring cell having a force initiation device which is simple in operation and exhibits reduced sensitivity to the influence of external forces and/or an asymmetrical load incidence.

It is a further object of the present invention to provide a gyroscopic force measuring cell which is substantially impervious to incident loads which exhibit a slight deviation relative to the precessional axis.

It is another object of the present invention to provide such a gyroscopic force measuring cell having a mass moment of inertia about the precessional axis which is as low as possible.

The above objects are inventively achieved in a gyroscopic force measuring cell having a device for force initiation from a non-precessional load pickup through a co-precessing transmission element disposed in a pivot bearing in the precessional axis. The pivot bearing is hinged to the frame supporting the gryoscope so as to be coaxially movable in guides relative to the precessional axis. The transmission element comprises a shaft seated in the pivot bearing having a substantially radially extending load arm and a linkage connecting the load arm to the inner gyroscope gimbal. The load arm, the linkage, the rotational axis and the precessional axis are all disposed in substantially one plane.

The construction of a pivot bearing hinged to the gyroscope-supporting frame which is co-movable in guides relative to the precessional axis is an uncomplicated yet functionally reliable guidance means which is insensitive to the influence of external forces and asymmetrical loads, yet reliably transmits such loads to the gyroscope portion of the measuring cell for measurement of such loads.

The relatively low outlay for mechanical parts results in an extremely low mass moment of inertia about the precessional axis and thus a gyroscopic force measuring cell which is substantially insensitive to mass-inertia is achieved, which is particularly advantageous in the case of rapid load changes.

In a further embodiment of the invention, the load arm, the linkage, the rotational axis and the precessional axis are disposed in the common plane in an essentially rectangular configuration.

DESCRIPTION OF THE PREFERRED EMBODIMENTS

Figure 1:
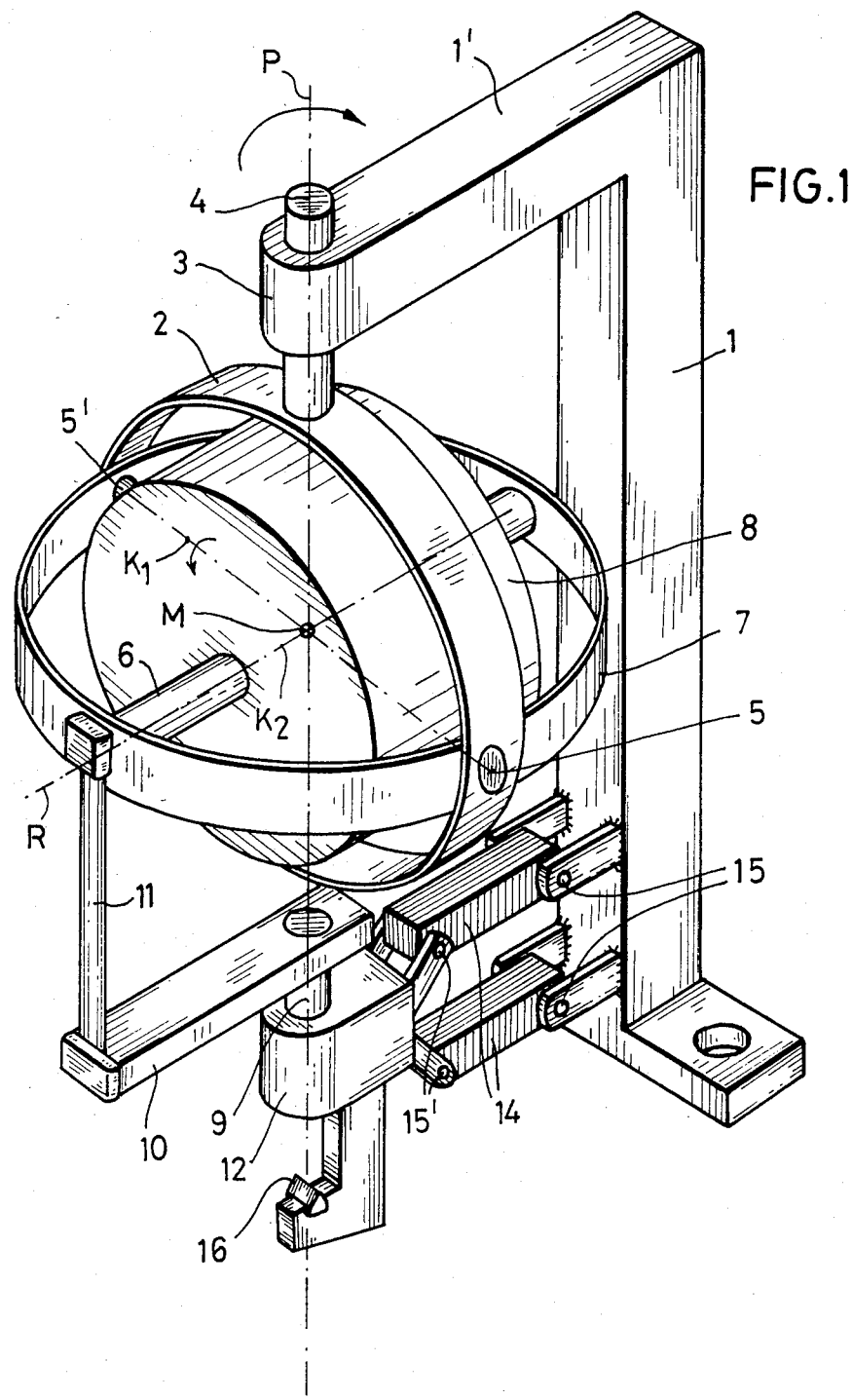
FIG. 1 is a perspective view of a gyroscopic force measuring cell constructed in accordance with the principles of the present invention.

A gyroscopic force measuring cell constructed in accordance with the principles of the present invention is shown in FIG. 1. The cell includes a frame 1, which is part of a larger housing, having a substantially horizontal beam 1' connected thereto. The beam 1' has a free end at which a pivot 3 is located, including a vertically disposed shaft 4. The vertical axis of the shaft 4 is the precessional axis P for the gyroscope system. An outer gyroscope gimbal 2 is connected to the shaft 4 so as to be able to rotate about the vertical axis of the pivot 3 in the precessional axis P. The outer gimbal 2 has two horizontal bearing necks 5 and 5' by means of which an inner gyroscope gimbal 7 is pivotally connected to the outer gimbal 2.

The Cardanic axis $K_1$ for the inner gimbal 7 pivotable thereabout is defined by the bearing necks 5 and 5'. A gyroscope shaft 6, which carries the gyroscope 8, is rotatably seated in the inner gimbal 7 along a gyroscope axis $K_2$, which is perpendicular to the Cardanic axis $K_1$. The gyroscope 8 is thus suspended force-free in all directions.

The measuring cell further includes guide members 14 spaced above one another and mounted on hinges 15 disposed at the base of the frame 1. The outer ends of the guide members 14 are connected via hinges 15' to a pivot bearing housing 12. The pivot bearing housing 12 is thus vertically movable in the direction of the precessional axis P. A load transmission shaft 9, co-precessing with the gyroscope 8, is rotationally seated so as to be movable in the pivot bearing housing 12. The load transmission shaft 9 has a load arm 10 connected thereto so as to extend substantially horizontally. The load arm 10 is connected to a force transmission element 11, which is in turn connected to the inner gyroscope gimbal 7. A non-co-precessing load support element 16 such as, for example, a bezel, is disposed below the pivot bearing housing 12.

Figure 2:
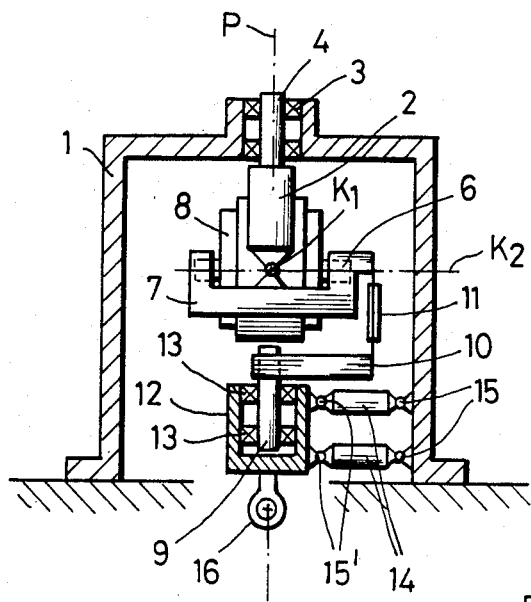
FIG. 2 is a schematic side view of the gyroscopic force measuring cell shown in FIG. 1, shown partly in section.

The same arrangement is shown in side view in FIG. 2. The frame 1 has the pivot joint 3 disposed therein at an upper portion thereof and the shaft 4 is seated therein so as to be freely rotatable. The shaft 4 carries the outer gimbal 2 at its lower end. The inner gimbal 7 is pivotably seated along the Cardanic axis $K_1$. The inner gimbal 7 receives the gyroscope shaft 6 carrying the gyroscope 8 coaxially to the gyroscope axis $K_2$. The hinges connecting the guide members 14 are disposed at the base of the frame 1. The pivot bearing housing 12 is linked to the guide means 14 by means of hinges 15'. The load transmission shaft 9 is seated so as to be freely rotatable in the pivot bearing housing 12, by means of the pivot bearing 13. The load support element 16 is disposed below the pivot bearing housing 12. The load arm 10 is connected to the load transmission shaft 9 and is in turn connected to the inner gimbal 7 through the force transmission element 11 at the bearing point of the gyroscope shaft 6.

Figure 3:
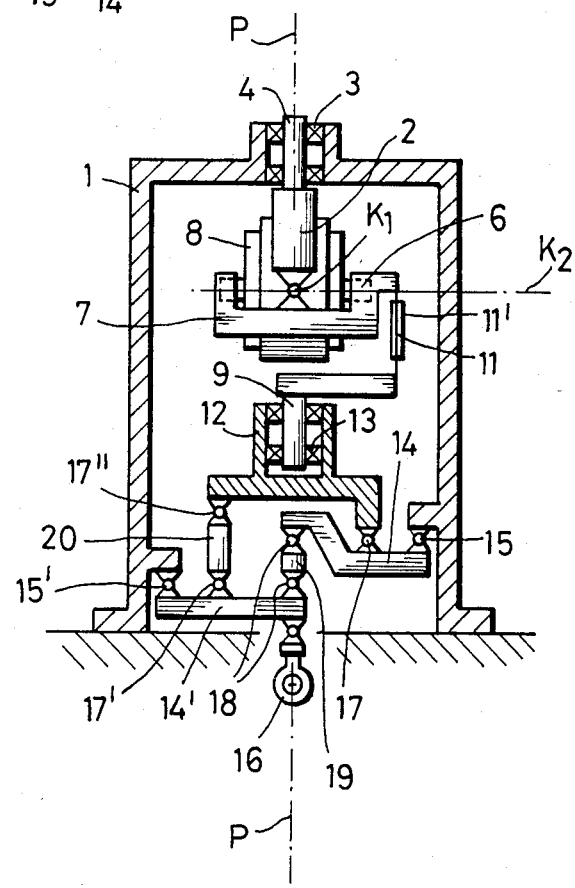
FIG. 3 is a side view of a further embodiment of a gyroscopic force measuring cell constructed in accordance with the principles of the present invention having a different guide arrangement.

A further embodiment is shown in FIG. 3 differing only in the means by which the pivot bearing housing 12 is connected to the other components. In this embodiment, two guide members 14 and 14' are connected to the frame 1 at different levels by means of respective hinges 15 and 15'. The free ends of the guide members 14 and 14' terminate substantially in alignment with the precessional axis P. These free ends are connected to each other by means of a connecting element 19 via two joints 18 disposed in alignment with each other and the precessional axis P. The pivot bearing 12 is flexibly connected to the guide members 14 and 14' with a three-joint arrangement consisting of joints 17, 17' and 17", the joints 17' and 17" being flexibly connected by a transition 20. The transition element 20 is thus vertically movable precisely parallel to the precessional axis P. While the embodiment shown in FIG. 3 is suited for transmission and measurement of large forces, and offers advantages in the measurement of such large forces by virtue of the precision guidance of the pivot bearing housing 12, although the embodiment shown in FIG. 3 requires more material outlay than the embodiment of FIGS. 1 and 2.

The hinges 15 and 15', the joints 17, 17' and 17" and the joints 18 may all be disposed of respective axes which are contained in a plane which also contains the precession axis P.

The force transmission element 11 may be comprised of material which is inelastic in the direction of force transmission and which is elastic in directions at right angles thereto, such as, for example, tensile tape or wire. The force transmission element 11 may be provided with a stiffening means 11'.

Operation of all of the embodiments is as follows. An external force incident at the load support element 16 causes vertical movement constrained by the guide members 14 (or 14 and 14') of the pivot bearing housing 12. This movement, corresponding to the magnitude of the external force, is transmitted to the load transmission shaft 9 seated in the pivot bearing housing 12 coaxially relative to the precessional axis P, and is further transmitted through the load arm 10 and the force transmission element 11 to the shaft 6 of the gyroscope 8. A torque acting to deflect the gyroscope 8 out of its rotational plane thus influences the gyroscope shaft 6. This torque causes precession about the precessional axis P which is coincident with the rotational axis of the shaft 4. Because, given a negligible mass moment of inertia around the precessional axis P, the precession is executed at a speed which is exactly proportional to the external load incident at 16, the magnitude of the load can be directly measured by conventional means by measuring the speed of the precessional motion.

Although modifications and changes may be suggested by those skilled in the art, it is the intention of the inventor to embody within the patent warranted herein all changes and modifications as reasonably and properly come within the scope of his contribution to the art.

I claim as my invention:

1. A gyroscopic force measuring cell comprising:
   a frame;
   a gyroscope suspended force-free from said frame by an inner gimbal and an outer gimbal, said gyroscope having a rotational axis;
   a pivot bearing housing connected to a non-co-precessing load pickup at which a force to be measured is present;
   a guide means coaxially movable relative to the precessional axis of said gyroscope interconnected between said pivot bearing housing and said frame; and
   a co-precessing transmission means interconnected between the pivot bearing housing and said inner gimbal including a shaft seated in a pivot bearing in said pivot bearing housing, said shaft having a substantially radially extending load arm and a force transmission element interconnected between said load arm and said inner gimbal,
   whereby a force incident at said load pickup acting at said rotational axis of said gyroscope generates a torque producing precessional motion of said gyroscope around said precessional axis having a velocity which is proportional to said force.

2. A gyroscopic force measuring cell as claimed in claim 1:
   wherein said load arm, said force transmission element, said rotational axis and said precessional axis are disposed substantially in one plane.

3. A gyroscopic force measuring cell as claimed in claim 1:
   wherein said load arm, said force transmission element, said rotational axis and said precessional axis form a rectangular configuration.

4. A gyroscopic force measuring cell as claimed in claim 1:
   wherein said guide means is a pair of spaced parallel guide members connected by hinges to said frame and to said pivot bearing housing.

5. A gyroscopic force measuring cell as claimed in claim 1:
   wherein said guide means is comprised of:
   a pair of guide rods flexibly connected to opposite sides of said frame at different levels and having respective free ends interconnected by a connecting element at two respective joints disposed in alignment with said precessional axis, one of said guide members being connected to said pivot bearing housing by a single flexible joint and the other of said guide members being connected to said pivot bearing housing by two flexible joints with a second connecting element therebetween.

6. A gyroscopic force measuring cell as claimed in claim 5:

wherein said joints connecting said respective guide members to said frame, said joint connecting said one guide member to said pivot bearing housing, said two joints connecting said other guide member to said pivot bearing housing, and said joints connecting said guide members to each other are all aligned in respective axes in a plane which includes said precessional axis.

7. A gyroscopic force measuring cell as claimed in claim 1:
wherein said force transmission element is comprised of material which is inelastic in the direction of force transmission but elastic at right angles thereto.

8. A gyroscopic force measuring cell as claimed in claim 7:
wherein said force transmission element is comprised of tensile tape.

9. A gyroscopic force measuring cell as claimed in claim 7:
wherein said force transmission element is comprised of wire.

10. A gyroscopic force measuring cell as claimed in claim 7:
wherein said force transmission element is provided with a stiffening means.

* * * * *